(12) United States Patent
Rao et al.

(10) Patent No.: US 9,275,131 B2
(45) Date of Patent: Mar. 1, 2016

(54) DATA INDEXING SYSTEM, DATA INDEXING METHOD AND DATA QUERYING METHOD

(71) Applicant: NEC (China) Co., Ltd., Beijing (CN)

(72) Inventors: Jia Rao, Beijing (CN); Weisong Hu, Beijing (CN)

(73) Assignee: NEC (CHINA) CO., LTD., Beijing (CN)

( * ) Notice: Subject to any disclaimer, the term of this patent is extended or adjusted under 35 U.S.C. 154(b) by 528 days.

(21) Appl. No.: 13/712,411

(22) Filed: Dec. 12, 2012

(65) Prior Publication Data

US 2013/0254212 A1 Sep. 26, 2013

(30) Foreign Application Priority Data

Mar. 23, 2012 (CN) .......................... 2012 1 0080283

(51) Int. Cl.
*G06F 17/30* (2006.01)
(52) U.S. Cl.
CPC .... *G06F 17/30625* (2013.01); *G06F 17/30333* (2013.01); *G06F 17/30551* (2013.01)
(58) Field of Classification Search
CPC .................. G06F 17/30625; G06F 17/30333; G06F 17/30551
USPC ........................................................ 707/746
See application file for complete search history.

(56) References Cited

U.S. PATENT DOCUMENTS 5,701,467 A * 12/1997 Freeston ....................... 707/741
6,470,344 B1 * 10/2002 Kothuri et al. ................ 707/696
2009/0216787 A1 * 8/2009 Wang et al. ................... 707/101
2012/0299965 A1 * 11/2012 Agarwal et al. ............... 345/660

FOREIGN PATENT DOCUMENTS

| JP | H07-146880 A | 6/1995 |
|---|---|---|
| JP | 2001-1230993 A | 8/2001 |
| JP | 2009-093349 A | 4/2009 |
| JP | 2010-506311 A | 2/2010 |

OTHER PUBLICATIONS

Konomi, S., et al. "I-Tree: A Spatial Time-Series Indexing Mechanism for Supporting Integrated Retrieval of Sensing Data" Information Processing Society of Japan, vol. 4, No. 1. Mar. 2011. (14 Pages).
Japan Patent Office. Notification of Reasons for Rejection for Japanese Patent Application No. 2012-271520. Mailed Sep. 30, 2013. (5 Pages).

* cited by examiner

*Primary Examiner* — Jean B Fleurantin
*Assistant Examiner* — Evan Aspinwall
(74) *Attorney, Agent, or Firm* — Tutunjian & Bitetto, P.C.

(57) ABSTRACT

A data indexing system is provided. The system includes: a time interval splitting unit configured to split a predetermined time range into a plurality of time intervals. A first index creating unit is configured to create a first-level index for data in a current time interval, the first-level index including a time interval index and a subspace index. A second index creating unit is configured to create, in a time interval after the current time interval, a second-level index for data in the current time interval. The second-level index has a finer granularity than the first-level index. A data indexing method and a data querying method are also provided. The cost for index maintenance can be greatly reduced in a case of frequent updates. Further, invalid scans during the query process can be reduced and the query performance can be improved.

10 Claims, 4 Drawing Sheets

DATA INDEXING SYSTEM, DATA INDEXING METHOD AND DATA QUERYING METHOD

TECHNICAL FIELD

The present invention relates to cloud computing, and more particularly, to a data indexing system, a data indexing method and a data querying method.

BACKGROUND

With the development of technologies such as Radio Frequency Identification (RFID) and Global Positioning System (GPS), Internet of Things (IOT) has been rapidly and widely applied. In the IOT environment, millions of detected objects periodically generate data, resulting in bottleneck in scalability for traditional relational databases due to insufficient system throughput.

A cloud data management system, which has a high scalability and supports high concurrency, is an effective solution for the IOT data management. The cloud data management system is capable of efficient point query and range query in a rowkey, while a full-table scan is required for a non-rowkey query. Although the query efficiency can be improved by utilizing the Map-Reduce technique, the performance is poor for a query having a low selection rate.

Typically, the IOT data has a multi-dimensional characteristic. In addition to information in time and space dimensions, the IOT data contains information in a number of other dimensions. Moreover, a query for the IOT data is generally a multi-dimensional query based on time and space. Thus, in an IOT application environment, it is desired to provide an efficient multi-dimensional query in addition to a rapid signal dimensional query.

Another characteristic of the IOT data is that it is frequently updated. In the IOT environment, monitored objects typically generate new data periodically at a particular time interval and the data is frequently updated. In particular, in a case of a large number of monitored objects and a high data sampling frequency, the data concurrency is very high, which imposes a requirement for high throughput of the data management system.

Currently, a multi-dimensional data indexing scheme in a cloud system, RT-CAN (R-tree based index in content addressable network), has been proposed, which is dedicated for indexing and querying multi-dimensional data. The RT-CAN indexing scheme is a double layer indexing scheme based on R-tree and supports point query and range query for a number of attributes. At each storage node, an R-tree index is created for local data and then some nodes are selected from each local index based on a particular index node selection policy and distributed to a local index. In order to improve the querying speed and ensure the scalability of the system, a coverage network, CAN network, supporting multi-dimensional query is adopted in the global index and an adaptive adjustment policy based on cost model is used for index node selection.

In particular, the RT-CAN indexing scheme generally includes the following operations: 1) upon receiving a new data insertion request from a client, finding a corresponding storage node via a cloud storage system interface and storing the data in the node; 2) updating a local index in a R-tree structure created at the storage node; and 3) synchronizing the updated local index to a global index.

However, in order to maintain the balance of the tree, during the process of data insertion, the RT-CAN scheme needs to constantly perform a splitting adjustment for an index node (each data insertion will trigger an update of the local index, which in turn affects the global index). Thus, the cost for index maintenance, especially for applications with frequent data insertions, is so high that the system throughput will be significantly degraded. Therefore, this scheme is not applicable to the IOT.

Accordingly, there is a need for a data indexing system and method applicable to the IOT and capable of achieving high throughput operations on the multi-dimensional data which is frequently updated in the IOT.

SUMMARY

According to the present invention, a solution capable of supporting both frequent data update and efficient data query is provided. The main idea of the present invention lies in that, in an IOT application, data of monitored objects will not change once generated. In addition, the spatial distribution of the monitored objects is typically not uniform and may change from one time interval to another. Thus, it is possible to split data in the time dimension into data in current time interval and data in historical time interval and index data in different time intervals on different granularities, such that the number of index updates and the cost for index maintenance can be reduced. Further, the data can be split in consideration of the non-uniform distribution of the data in time and space.

According to an aspect of the present invention, a data indexing system is provided. The system includes: a time interval splitting unit configured to split a predetermined time range into a plurality of time intervals; a first index creating unit configured to create a first-level index for data in a current time interval, the first-level index including a time interval index and a subspace index; and a second index creating unit configured to create, in a time interval after the current time interval, a second-level index for data in the current time interval. The second-level index has a finer granularity than the first-level index.

Preferably, the first index creating unit is configured to create the time interval index by using B+ tree, each leaf node of the B+ tree involving the subspace index.

Preferably, the first index creating unit is configured to create the subspace index by using R tree.

Preferably, the second index creating unit is configured to create the second-level index by using R tree or a grid index, the second-level index being a record-level index.

Preferably, the system further includes a data storing unit configured to store data adjacent in time and space into the same storage area or adjacent storage areas.

Preferably, the time interval splitting unit is configured to split a predetermined time range into a plurality of time intervals based upon apriori knowledge such that the data is distributed uniformly in the plurality of time intervals.

Preferably, the time interval splitting unit is further configured to calculate a uniformity of data splitting and a number of data layers for each time interval, to split a certain time interval into more time intervals if the uniformity of data splitting for the certain time interval is larger than a first threshold and the number of data layers for the certain time interval is larger than a second threshold, or to combine a certain time interval with an adjacent time interval if the uniformity of data splitting for the certain time interval is less than a first threshold and the number of data layers for the certain time interval is less than a second threshold.

According to another aspect of the present invention, a data indexing method is provided. The method includes: splitting a predetermined time range into a plurality of time intervals;

creating a first-level index for data in a current time interval, the first-level index including a time interval index and a subspace index; and creating, in a time interval after the current time interval, a second-level index for data in the current time interval. The second-level index has a finer granularity than the first-level index.

Preferably, the time interval index is created by using B+ tree, each leaf node of the B+ tree involving the subspace index.

Preferably, the subspace index is created by using R tree.

Preferably, the second-level index is created by using R tree or a grid index, the second-level index being a record-level index.

Preferably, the method further includes storing data adjacent in time and space into the same storage area or adjacent storage areas.

Preferably, the step of splitting comprises: splitting a predetermined time range into a plurality of time intervals based upon apriori knowledge such that the data is distributed uniformly in the plurality of time intervals.

Preferably, the step of splitting further comprises: calculating a uniformity of data splitting and a number of data layers for each time interval; splitting a certain time interval into more time intervals if the uniformity of data splitting for the certain time interval is larger than a first threshold and the number of data layers for the certain time interval is larger than a second threshold; or combining a certain time interval with an adjacent time interval if the uniformity of data splitting for the certain time interval is less than a first threshold and the number of data layers for the certain time interval is less than a second threshold.

According to yet another aspect of the present invention, a data querying method is provided. The method includes: determining whether the data to be queried is current data or historical data; querying the data through a first-level index if the data is current data, the first-level index including a time interval index and a subspace index; or querying the data through a second-level index if the data is historical data. The second-level index has a finer granularity than the first-level index.

Preferably, the querying comprises one of the following: point querying, range querying, and K nearest neighbors querying.

Preferably, the time interval index is created by using B+ tree, each leaf node of the B+ tree involving a subspace index.

Preferably, the subspace index is created by using R tree.

Preferably, the second-level index is created by using R tree or a grid index, the second-level index being a record-level index.

With the present invention, it is possible to create indexes for current data and historical data on different indexing granularities. In this way, the cost for index maintenance can be greatly reduced in a case of frequent updates. Further, the data splitting policy according to the present invention allows the data within the storage nodes to be uniformly distributed and adjacent to each other in physical storage space, such that invalid scans during the query process can be reduced and the query performance can be improved.

BRIEF DESCRIPTION OF THE DRAWINGS

The above and other features of the present invention will be more apparent from the following detailed description taken in conjunction with the figures, in which.

DETAILED DESCRIPTION OF THE EMBODIMENTS

The principle and implementation of the present invention will be more apparent from the following descriptions of embodiments of the present invention with reference to the figures. It should be noted that the present invention is not limited to the following embodiments. In addition, descriptions of well known elements irrelevant to the present invention will be omitted for simplicity.

First Embodiment

Figure 1:
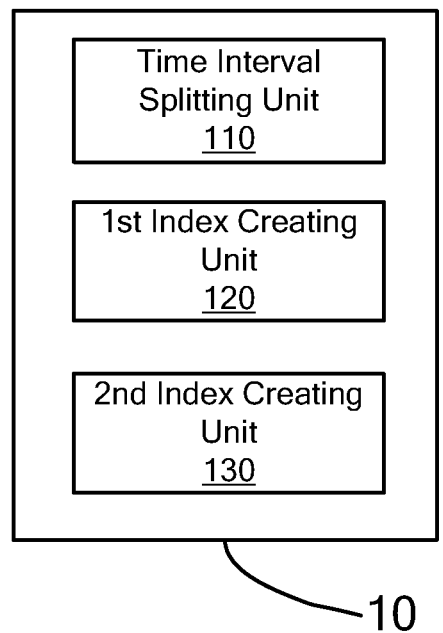
FIG. 1 is a block diagram of a data indexing system according the first embodiment of the present invention.

FIG. 1 is a block diagram of a data indexing system 10 according the first embodiment of the present invention. As shown in FIG. 1, the system 10 includes a time interval splitting unit 110, a first index creating unit 120 and a second index creating unit 130. The operations of the individual units in the system 10 will be detailed in the following.

The time interval splitting unit 110 is configured to split a predetermined time range into a plurality of time intervals. Since the regional distribution of IOT data typically varies over time, the time interval splitting unit 110 can split the data into a number of time intervals (TIS) in the time dimension, i.e.:

$$TIS=\{[t_1,t_2),[t_2,t_3),\ldots,[t_{i-1},t_i),\ldots\},$$

where $[t_{i-1},t_i)$ is a left closed, right open time interval. All these time intervals do not overlap with each other. Of course, it can be appreciated by those skilled in the art that each time interval $[t_{i-1}, t_i)$ can alternatively be a left open, right closed time interval.

The time interval splitting unit 110 can split a predetermined time range into a plurality of time intervals based upon apriori knowledge. Preferably, the time interval splitting unit 110 can split a predetermined time range into a plurality of time intervals based upon apriori knowledge such that the data is distributed uniformly in the plurality of time intervals. For example, in an exemplary application for monitoring travelling vehicles, the splitting operation can be carried out in units of days (i.e., using a day as the predetermined time range) to split the daytime into short time intervals and the nighttime into long time intervals. In this way, the number of data in each time interval can be substantially the same.

After the time interval splitting unit 110 splits the predetermined time range into a plurality of time intervals, the first index creating unit 120 creates a first-level index (coarse-grained index) for data in a current time interval. The first-level index includes a time interval index and a subspace index. In this embodiment, the first index creating unit 120 can use various data structures to create the indexes for time intervals and subspaces, respectively. For example, the first index creating unit 120 can create the indexes for the time intervals using a B+ tree and create the indexes for the subspaces using an R tree.

The second index creating unit 130 is configured to create, in a time interval after the current time interval, a second-level index (fine-grained index) for data in current time interval. In this embodiment, the second index creating unit 130 can use various data structures to create the second-level index. For example, the second index creating unit 130 can create the second-level index using an R tree.

Next, the exemplary operations of the first index creating unit 120 and the second index creating unit 130 will be described with reference to FIG. 2.

Figure 2:
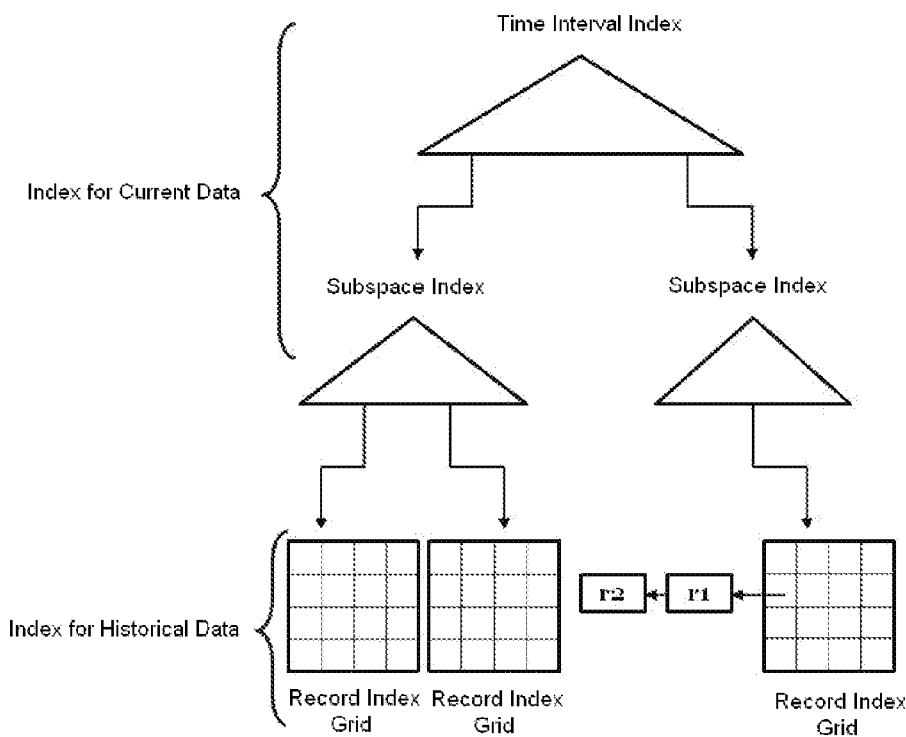
FIG. 2 is a schematic diagram of an indexing structure according to the first embodiment of the present invention.

FIG. 2 is a schematic diagram of an indexing structure according to the first embodiment of the present invention. As shown in FIG. 2, the first two layers of the indexing structure are a time interval index and a subspace index, respectively. The time interval index and the subspace index are indexes for the data in the current time interval (first-level indexes). The third layer of the indexing structure is record-level grid indexes which are indexes for the data in historical time intervals (second-level indexes).

It is assumed that the current time interval is $[t_1, t_2)$. The first index creating unit 120 creates for the data in the current time interval $[t_1, t_2)$ a first-level index (the first layer index in FIG. 2). Here, all data in the current time interval have the same time interval index. Further, the first index creating unit 120 divides a two-dimensional region into a number of complement and overlapping rectangular subspaces. For example, this division can be carried out using Bucket PR KD-tree or Bucket PR Quadtree. Each of these rectangular subspaces can correspond to a storage area. These subspaces can be indexed using an R-tree. In this way, based on the divided subspaces, a subspace index (the second layer index in FIG. 2) can be created for the data in the current time interval.

When the next time interval $[t_2, t_3)$ has come, the previous time interval $[t_1, t_2)$ becomes a historical time interval and the time interval $[t_2, t_3)$ becomes the current time interval. Likewise, following the above process, the first index creating unit 120 creates a first-level index for the data in the time interval $[t_2, t_3)$. Additionally, the second index creating unit 130 creates a second-level index (the third layer index in FIG. 2) for the data in the historical time interval $[t_1, t_2)$. As an example, in order to speed up the data query within a region, a record-level local index can be created for each region. The local index may have a form of an R-tree or a grid index.

Referring again to FIG. 1, preferably, the time interval splitting unit 110 can dynamically adjust the splitting policy depending on whether the splitting result is reasonable or not. That is, the time interval splitting unit 110 can be configured to split a predetermined time range into a plurality of time intervals such that the data is distributed uniformly in the plurality of time intervals.

In practice, the data is increased monotonously in the time dimension and is typically fixed in a particular region in the space dimension. Also, the IOT data generally has different distribution patterns in time and space. Thus, the time and the space can be considered separately. In the time dimension, it is split into a number of time intervals according to the distribution pattern of the data. The data in a particular time interval can be dynamically split in the space dimension using for example Bucket PR KD-tree or Bucket PR Quadtree. Further, a relatively dense space can be divided multiple times such that the data can be uniformly distributed across the subspaces.

For example, the time interval splitting unit 110 can split, in units of days, the data in each day into a plurality of time intervals (i.e., splitting one day into a plurality of time intervals). Preferably, the time interval splitting unit 100 can be configured to optimize the data splitting by performing the following process (dynamical data splitting).

1) First, the total number of the data records in a day, N, can be estimated in accordance with a specific application scenario. It is assumed that each subspace contains up to S records and the data in each time interval can be split uniformly into R subspaces. Thus, a day can be split into $$K = \left\lfloor \frac{N}{S} * \frac{1}{R} \right\rfloor$$

intervals, which are denoted as t1, t2, . . . , tk.

2) The data in each of the time intervals t1, t2, . . . , tk is split spatially using Bucket PR KD-tree. The depth of the tree is recorded, the size of each subspace is monitored and the variance of the data amount in the respective subspaces in each time interval is calculated as:

$$D_i = \sqrt{\frac{1}{N_i - 1} \sum_{m=1}^{N_i} (x_m - \bar{x})^2}$$

where $N_i$ denotes the number of subspaces in the time interval ti, $x_m$ denotes the size of the m-th subspace in the $t_i$-th time interval and $\bar{x}$ denotes the average size of the subspaces, and $D_i$ denotes the variance of the subspace sizes in the $t_i$-th time interval which reflects the uniformity degree of the data splitting in the time interval.

3) The splitting in the time interval is adjusted based on the variance $D_i$ and the number of data split layers, $Dep_i$. In particular, if $D_i$ exceeds a threshold, it indicates that the data distribution in the time interval is not uniform. At the same time, if $De_i$ is larger than a threshold, the time interval needs to be shortened. Thus, the time interval $t_i$ can be split into two time intervals $t_{i1}$ and $t_{i2}$. If $D_i$ is smaller than a threshold, it indicates that the data distribution is relatively uniform. At the same time, if $De_i$ is smaller than a threshold, it indicates that the amount of data in the $t_i$-th time interval is too small and the $t_i$-th time interval can be combined with its adjacent time interval ($t_{i-1}$ or $t_{i+1}$).

4) if the splitting of time intervals and the splitting of the regions remain the same for a time period, the splitting policy can be fixed and the dynamic splitting can be terminated. In addition, during the system operation, the data distribution can be continuously monitored. Once a non-uniform data distribution is found, the dynamic data splitting can be perform again.

With the system according to this embodiment, the cost for index maintenance is reduced so as to support frequent updates of massive data in the IOT application.

Second Embodiment

Figure 3:
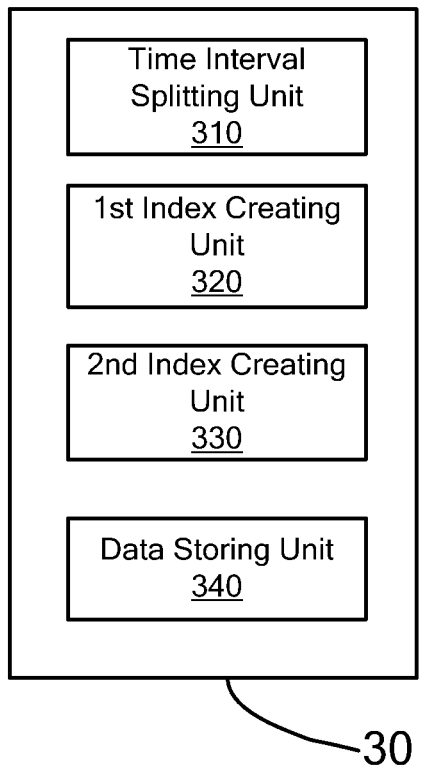
FIG. 3 is a block diagram of a data indexing system according the second embodiment of the present invention.

FIG. 3 is a block diagram of a data indexing system 30 according the second embodiment of the present invention. As shown in FIG. 3, the system 30 includes a time interval splitting unit 310, a first index creating unit 320, a second index creating unit 330 and a data storing unit 340. It is to be noted that the time interval splitting unit 310, first index creating unit 320 and second index creating unit 330 shown in FIG. 3 are similar to the time interval splitting unit 110, first index creating unit 120 and second index creating unit 130 shown in FIG. 1, respectively. For simplicity, only the data storing unit 340 will be detailed in the following.

The data storing unit 340 is configured to store data adjacent in time and space into the same storage area or adjacent storage areas. In this way, the number of storage areas to be scanned during the querying process can be reduced, thereby improving the query efficiency.

Figure 4:
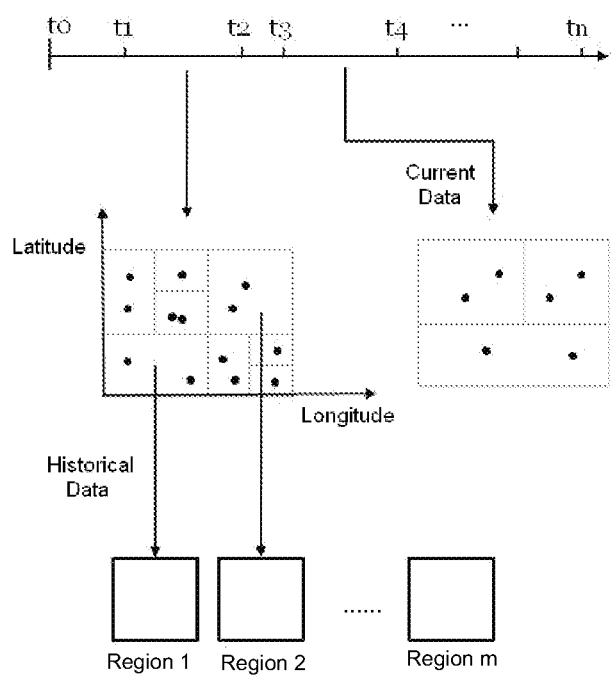
FIG. 4 is a schematic diagram illustrating operations of a data storing unit according to an embodiment of the present invention.

In particular, FIG. 4 is a schematic diagram illustrating operations of the data storing unit 340 according to an embodiment of the present invention. As shown in FIG. 4, a predetermined time range has been split into a number of time intervals and the data in each time interval is split in a two-dimensional space to form a number of subspaces. The data storing unit 340 stores the data within the historical time interval $[t_0, t_3)$ in Area 1 and Area 2 and stores the data within the current time interval $[t_3, t_4)$ in Area m. These storage areas (Area 1, Area 2, . . . , Area m) are physically adjacent storage areas.

Since the data adjacent in time and space are stored in physically adjacent storage areas, these storage areas can be rapidly read in data query, such that the query efficiency can be improved, as further detailed in the following (in connection with the fourth embodiment).

With the system according to this embodiment, frequent updates of massive data in the IOT application can be supported and the number of storage areas to be scanned during the IOT data query process can be reduced, thereby improving the query efficiency.

Third Embodiment

Figure 5:
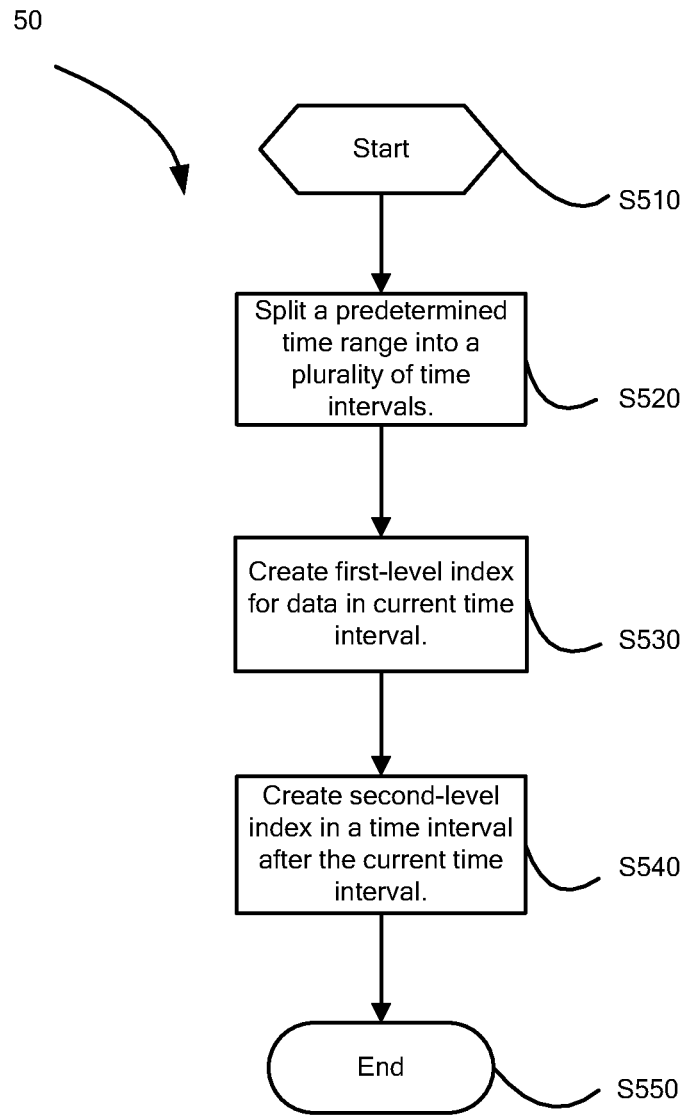
FIG. 5 is a flowchart of a data indexing method according to the third embodiment of the present invention.

FIG. 5 is a flowchart of a data indexing method 50 according to the third embodiment of the present invention. As shown in FIG. 5, the method 50 starts at step S510.

At step S520, a predetermined time range is split into a plurality of time intervals. The predetermined time range can be split into a plurality of time intervals based upon a prior knowledge such that the data is distributed uniformly in the plurality of time intervals. Preferably, the splitting policy can be dynamically adjusted depending on whether the splitting result is reasonable or not.

At step S530, a first-level index (coarse-grained index) is created for data in a current time interval. The first-level index includes a time interval index and a subspace index. Various data structures can be used to create the indexes for time intervals and subspaces, respectively. For example, the indexes for the time intervals can be created using a B+ tree and the indexes for the subspaces can be created using an R tree.

At step S540, in a time interval after the current time interval, a second-level index (fine-grained index) is created for the data in the current time interval. Various data structures can be used to create the second-level index, e.g., R-tree.

Finally, the method 50 ends at step S550.

With the method according to this embodiment, frequent updates of massive data in the IOT application can be supported and the number of storage areas to be scanned during the IOT data query process can be reduced, thereby improving the query efficiency.

Fourth Embodiment

Figure 6:
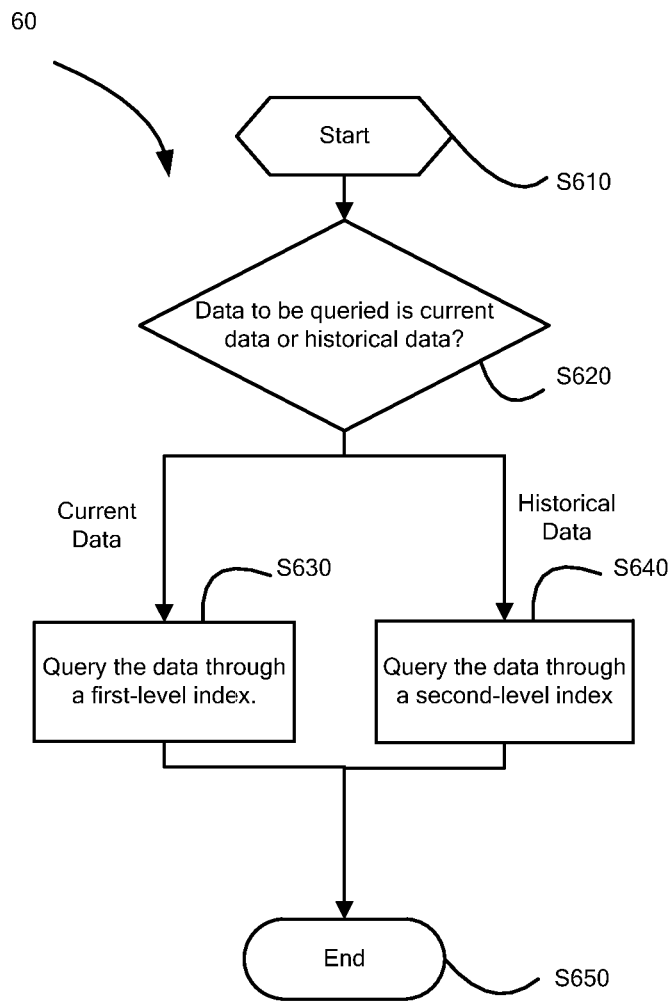
FIG. 6 is a flowchart of a data querying method according to the fourth embodiment of the present invention.

FIG. 6 is a flowchart of a data querying method 60 according to the fourth embodiment of the present invention. As shown in FIG. 6, the method 60 starts at step S610.

At step S620, it is determined whether the data to be queried is current data or historical data.

If the data to be queried is current data, at step S630, the data is queried through a first-level index. The first-level index includes a time interval index and a subspace index.

If the data to be queried is historical data, the data is queried through a second-level index. The second-level index has a finer granularity than the first-level index.

In the method 60, the time interval index can be created by using B+ tree. Each leaf node of the B+ tree involves a subspace index which can be created by using R tree. Further, the second-level index can be created by using R tree or a grid index. The second-level index is a record-level index.

The query performed in the method 60 includes, but is not limited to, the following types of queries: point query, range query and K nearest neighbors query. These three types of queries will be detailed below.

Point Query

It is assumed that Q(t, lat, lon) represents a point query with respect to time, latitude and longitude. After this point query is initiated by the user, the time interval to which the point to be queried belongs can be first determined from the time t based on the time interval index. Then, the rowkey of the point to be queried can be calculated from the time interval and the information on its latitude and longitude. Finally, a query request can be initiated to a cluster based on the rowkey and the returned result can be filtered based on t, lat and lon.

The process of point query can be described as Algorithm 1 (pseudo code) below. In particular, the first code line initializes the result set. The second code line calculates a sequence number of the time interval to which the time t belongs based on the time interval index. The third code line obtains the Z-value of the point to be queried based on the calculation rules of Z-ordering coding. The Z-value is the rowkey of the corresponding record. The fourth code line acquires the corresponding record using the rowkey directly. Since there may be more than one version of record underlying a single rowkey, the fifth code line filters all versions of data. Finally, the sixth code line returns the desired result.

---

Algorithm 1 - Point Query

1: $R_Q$ Ø/* Initialize the result set to empty set*/
2: Tn GetTimeIntervalNo(B-tree, t) /*Get the time interval number by t from B+tree index for time intervals*/
3: Z-value ComputeZvalue(Tn, lat, lon) /* Compute the Z-value */
4: Rs GetResultFromHBase (Z-value)/* Get the records by rowkey*/
5: $R_Q$ Filter(Rs, t,lat,lon)/*Get the related data using rowkey*/
6: return $R_Q$

---

Range Query

It is assumed that Q(Et, Es) represents a range query where Et denotes a time range and Es denotes a space range. The process of range query can be described as Algorithm 2 (pseudo code) below. In particular, the first to fourth code lines perform initialization. The fifth code line determines the time interval to which the data to be queried belongs based on the time interval index. The sixth to seventh code lines obtain a list of regions contained in the space range Es by querying the corresponding R tree index in each time interval. The eighth to seventeenth line codes query the desired data from the respective regions. If the range of a region is a subset of the range to be queried, (Et, Es), it indicates that all the data in the region are data in the result. In this case, the entire region can be scanned to obtain all the data. If the range of a region overlaps with the range to be queried, the overlapping degree between the region range and the range to be queried can be determined. If the overlapping degree is larger than a threshold, the entire region can be scanned and the desired data can be obtained by filtering during the scanning process. Otherwise, a rowkey of the corresponding data can be found based on local index, and the final data can be obtained by using the rowkey.

---
Algorithm 2 - Range Query
---

```
1:   /* Q(E_t, E_s) is the Range query, E_t stands for the time range, E_s
     stands for */
2:   the spatial range */
3:   R_Q Ø /* Initialize the result set to empty set*/
4:   S_Q Ø /* Initialize the related region set to empty set*/
5:   RT_Q GetRtreeFile(B-tree, E_t) /*Get all the R-tree files contained in
     E_t */
6:   for each R-tree file RT ∈ RT_Q do
7:     S_Q ∪ GetRegionsByRtreeFile (RT, Es) /* Get all the related
       regions */
8:   for each region R ∈ S_Q do
9:     if Abstract_R ⊆ (E_t, E_s) /* if the range of region R is a subset of
       query range*/
10:       R_Q ∪ ScanRegion (R)
11:    else if Abstract_R ∩ (E_t, E_s) then
12:      if Overlap (Abstract_R, (E_t, E_s) ) > ε then
13:        for each record r ∈ R do
14:          if r ∈ (E_t, E_s)
15:            R_Q ∪ r
16:        else
17:          R_Q ∪ SearchWithRtree (R, E_t, E_s)
18:  return R_Q
```

K Nearest Neighbors (KNN) Query

The process of KNN Query can be described as Algorithm 3 below. In particular, the process mainly involves two steps: query extending and filtering. The query extending step extends the range to be queried. The filtering step calculates the data in the current range and determines whether it satisfies a requirement.

In particular, the first to fifth code lines perform initialization. The sixth code line determines a corresponding R tree index based on time. The seventh to fourteenth code lines obtain a list of regions based on the query point Q and the query radius. For each region, a possible range of a rowkey is determined based on the range of the region and the query radius. Then, the data is acquired based on the range of the rowkey. Finally, the fifteenth code line extends the range to be queried.

---
Algorithm 3 - KNN Query
---

```
1:   /* Q(x,y,t,k) be the point for the query. Get the K nearest neighbors
     from point q(x, y) in time interval ΔT */
2:   PQregion ← Ø /*relatedregions*/
3:   PQresult ← CreatePriorityQueue(k)/* queue capacity is k. */
4:   RKscanned ← Ø /*scanned rowkey*/
5:   radius ← d /*radius size for search: d equal with the interval
     of the Z-ordering */
6:   RTFile ← GetRtreeFile(B-tree, t) /* Get the responding
     R-tree file according to time t */
7:   while size(PQresult) < k
8:     PQregion ← GetRegionsByRtreeFiles(Q, radius, RTFile)
9:       for each Region R ∈ PQregion do
10:        RowkeyRange ← caculateZorder(Q,radius,R) – RKscanned
11:        resultSet ← scan(rowkeyRange)
12:        for each point p ∈ resultSet
13:          Enqueue(p,distance(p,Q),PQresult)
14:      RKscanned ∪ RowkeyRange
15:      radius ← radius + 100d
```

With the method according to this embodiment, the number of storage areas to be scanned during the IOT data query process can be reduced, thereby improving the query efficiency.

To summarize, with the present invention, it is possible to create indexes for current data and historical data in different indexing levels (different indexing granularities). In this way, the cost for index maintenance can be greatly reduced in the case of frequent updates. Further, the dynamic data splitting process according to the present invention allows the data within the storage nodes to be uniformly distributed and adjacent to each other in space, such that invalid scans during the query process can be reduced and the query performance can be improved.

It is to be noted that the above embodiments of the present invention can be implemented in hardware, software or any combination thereof. For example, in the above embodiments, the data indexing system and its internal components can be implemented by various devices including, but not limited to, general purpose processor, Digital Signal Processor (DSP) circuit, programmable processor, Application Specific Integrated Circuit (ASIC), Field Programmable Gate Array (FPGA), Programmable Logic Device (PLD), and the like.

Furthermore, the embodiments of the present invention as disclosed here can be implemented in a computer program product. In particular, the computer program product has a computer readable medium with computer program logics coded thereon, which, when executed on a computing device, cause a processor to perform the operations (methods) according to the embodiments of the present invention. Such arrangement of the present invention is typically implemented as software, codes and/or other data structures provided or coded on computer readable medium such as optical medium (e.g., CD-ROM), floppy disk or hard disk, or firmware on one or more ROMs, RAMs or PROM chips or other mediums for micro codes, or a downloadable software image in one or more modules, or shared database. The software or firmware or such arrangement can be installed on a computing device to enable one or more processors in the computing device to implement the solutions according to the embodiments of the present invention.

While the present invention has been described above with reference to the preferred embodiments thereof, it can be appreciated by one skilled in the art that various modifications, alternatives and changes can be made without departing from the spirit and scope of the present invention. Therefore, the present invention is not limited to the above embodiments, but is defined by the attached claims and their equivalents.

What is claimed is:

1. A data indexing system, executed on a computing device, comprising:
   a time interval splitting unit configured in computer readable storage media to split a predetermined time range into a plurality of time intervals, the time interval splitting unit is configured:
   to split a predetermined tim me intervals based upon a priori knowledge such that the data is distributed uniformly in the plurality of time intervals,
   to calculate a uniformity of data splitting and a number of data layers for each time interval;
   to split a certain time interval into more time intervals if the uniformity of data splitting for the certain time interval is larger than a first threshold and the number of data layers for the certain time interval is larger than a second threshold, or
   to combine a certain time interval with an adjacent time interval if the uniformity of data splitting for the certain time interval is less than the first threshold and the number of data layers for the certain time interval is less than the second threshold;

a first index creating unit configured to create a first-level index for data in a current time interval, the first-level index including a time interval index and a subspace index; and a second index creating unit configured to create, in a time interval after the current time interval, a second-level index for data in the current time interval, wherein the second-level index has a finer granularity than the first-level index.

2. The system according to claim 1, wherein the first index creating unit is configured to create the time interval index by using B+ tree, each leaf node of the B+ tree involving the subspace index.

3. The system according to claim 1, wherein the first index creating unit is configured to create the subspace index by using R tree.

4. The system according to claim 1, wherein the second index creating unit is configured to create the second-level index by using R tree or a grid index, the second-level index being a record-level index.

5. The system according to claim 1, further comprising:
a data storing unit configured to store data adjacent in time and space into a same storage area or adjacent storage areas.

6. A data indexing method, executed on a computing device, comprising:
splitting a predetermined time range into a plurality of time intervals, wherein the step of splitting comprises:
splitting a predetermined time range into a plurality of time intervals based upon a priori knowledge such that the data is distributed uniformly in the plurality of time intervals, calculating a uniformity of data splitting and a number of data layers for each time interval, splitting a certain time interval into more time intervals if the uniformity of data splitting for the certain time interval is larger than a first threshold and the number of data layers for the certain time interval is larger than a second threshold, or combining a certain time interval with an adjacent time interval if the uniformity of data splitting for the certain time interval is less than the first threshold and the number of data layers for the certain time interval is less than the second threshold;

creating a first-level index for data in a current time interval and stored in computer readable storage media, the first-level index including a time interval index and a subspace index; and creating, in a time interval after the current time interval, a second-level index for data in the current time interval and stored in computer readable storage media, wherein the second-level index has a finer granularity than the first-level index.

7. The method according to claim 6, wherein the time interval index is created by using B+ tree, each leaf node of the B+ tree involving the subspace index.

8. The method according to claim 6, wherein the subspace index is created by using R tree.

9. The method according to claim 6, wherein the second-level index is created by using R tree or a grid index, the second-level index being a record-level index.

10. The method according to claim 6, further comprising:
storing data adjacent in time and space into a same storage area or adjacent storage areas.

* * * * *